United States Patent Office 3,796,797
Patented Mar. 12, 1974

3,796,797
MOLASSES CHLORAL FEED COMPOSITION FOR IMPROVING FEED UTILIZATION OF RUMINANTS
Roger C. Parish, King of Prussia, and John E. Trei, West Chester, Pa., assignors to Smithkline Corporation, Philadelphia, Pa.
No Drawing. Continuation-in-part of application Ser. No. 881,915, Dec. 3, 1969, now Patent No. 3,615,649. This application Oct. 22, 1971, Ser. No. 191,813
Int. Cl. A23k 1/02; A61k 27/00
U.S. Cl. 424—180  15 Claims

ABSTRACT OF THE DISCLOSURE

The reaction product of chloral with molasses improves the feed efficiency of ruminant animals. The products are inexpensive and easily prepared. The active ingredient is fed orally to ruminants usually admixed with the feed. The preferred active ingredient is the reaction product of wood molasses with chloral.

---

This application is a continuation-in-part of Ser. No. 881,915 filed Dec. 3, 1969, now Pat. No. 3,615,649 issued Oct. 26, 1971.

In our parent copending application we describe the advantage of using the polyhaloacetal products of certain haloacetaldehydes, preferably chloral, condensed with various saccharides and polysaccharides for increasing the feed efficiency of ruminant animals especially cows and sheep. There we state that the activity which is the result of inhibiting methanogenesis in the rumen is due to the haloacetal content. The saccharide portion of the haloacetal products serves as an inert carrying matrix which releases the haloacetal moiety uniformly while preserving the stability and palatability of the product.

In the parent application, we also describe the preferred starch-chloral condensation products on one hand and the reaction products of hemiacetaldehydes with crude saccharide containing products such as corn syrup, cellulose powder or methyl cellulose on the other hand. Each of these extremes of our corollary invention have certain practical disadvantages although they are most useful products. The preferred starch-chloral products are somewhat expensive due to the fact that for reproducibility certain uniform starches must be used and the product most often must be isolated and controlled in content. In increasing feed efficiency, cost to the grower of any supplement is most important. The reaction products of chloral with crude polysaccharide edibles contain relatively low haloacetal content due to extensive cross linking of the polysaccharides.

We have now discovered that certain condensation products have great advantage to the feed producer and to the farmer. These are the reaction products of haloacetaldehydes, preferably chloral with various molasses products. The products of this invention are used in crude form, therefore they are inexpensive. The carrying portion, i.e., the molasses, is a standard item already commonly used by the feed mixer or farmer, therefore a special brand of polysaccharides need not be shipped or bought. Also the molasses is, of course, very inexpensive being a common byproduct of the sugar or wood industries.

It should be noted that the exact structures of the reaction products are unknown; however, using the same reactants and reaction conditions, reproducible products are easily obtained.

The term "molasses" as used herein generically embraces the sugar cane and beet molasses products the most common of which is blackstrap molasses as well as the wood molasses products which resemble sugar molasses in physical appearance, somewhat in content, and also to significant ways in prior art use on the farm or ranch. The wood molasses products are often described in the art as aqueous soluble hemicellulose extracts of wood (see "Animal Nutrition," Maynard & Loosli, McGraw-Hill, 1956, p. 41, as well as references in our parent application). Cane molasses products are described in many publications, for example, in Western Livestock Journal, October 1970, p. 81.

Molasses contains complex mixtures of saccharides, proteins, inorganic salts and fatty products. Most all molasses products are soluble in water. The products can be either thick syrups in which water is present or solids which are produced by evaporation of the water from the parent molasses product or by supporting the molasses on various extenders as well known in the art.

Wood molasses is obtained by cooking wood in water under high pressure. The water soluble products are separated by evaporation of the water to the extent desired. Normally the percent of hemicellulose content of solid wood molasses is about 50–60%. The most common products of this type available are liquid or solid "Masonex." This is the trademark for the wood molasses products marketed by the Masonite Corporation, Chicago, Illinois. (See The Condensed Chemical Dictionary, Eighth Ed., page 545.)

We have unexpectedly found that chloral (or its hydrate or acetals) reacts readily with sugar or wood molasses to give a high chloral content molasses. The chloral is largely chemically bound as is noted by extraction of the product with a chloral soluble organic solvent, then assaying the extract for chloral content by colorimetric determination or chlorine assay. A small amount of excess unreacted chloral is not detrimental to the practical use of the product as long as its palatability is acceptable. As examples of the preparation of products of this invention are the following:

Solid wood molasses (Masonex), 500 g., and anhydrous chloral, 125 g., are thoroughly mixed and heated at steam bath temperature for 1½ hours. After cooling, the sample has little smell of chloral and is dried at room temperature for several hours under high vacuum. It analyzes for 20.2% chloral based upon chlorine content. Extraction by organic solvent removes only a trace (<1%) of free chloral.

Reaction of wood molasses (700 g.) with anhydrous chloral (300 g.) under the same conditions gives a solid product which contains 32.3% chloral of which 8% is not chemically combined.

Chloral may also be reacted with liquid molasses preparations. For example, molasses (100 g.) and chloral (anhyd.), 25 g., is heated briefly at steam bath temperature to give a product with no chloral odor but difficult to analyze for combined/free chloral hydrate.

A solid preparation may be produced from liquid molasses and chloral by spray drying. For example, chloral hydrate (70 g.) and liquid wood molasses (liquid Masonex) (225 g.) are dissolved in 300 ml. distilled H$_2$O and spray dried at 200° C. inlet temperature and 70° C. outlet temperature. The product is a dry solid with no odor of chloral which analyzes for 25% chloral.

Solid chloral-Masonex (22.5% chloral) is allowed to stand in the open at 37° C. and 60% relative humidity. After one month the chloral content is reduced to 19.8% chloral.

Solid chloral-molasses preparations are primarily useful as solid feed additives. Liquid chloral-molasses preparations are also useful in liquid feed formulations which are widely used in feed mixing plants or growing farms.

The reaction of chloral with solid Masonex appears to require only brief heating, for example up to four hours, to eliminate all chloral odor. At room temperature the reaction appears to be much slower, a strong odor of chloral remaining after standing for several days. High chloral content requires longer heating times. Usually the highest chloral content which gives a stable product is desirable.

In vitro tests show that chloral-molasses preparations are useful as methane inhibitors equally active with chloral-starch preparations of our parent application. The protocols for the in vitro tests and their direct relationship to increasing the feed efficiency of ruminants are described in detail in our parent application, now Pat. No. 3,615,649.

| Additive | Level (p.p.m.) | Percent $CH_4$ inhib. |
|---|---|---|
| Chloral-Masonex (20.2% chloral) | 36 | 89 |
| Chloral-Masonex (38% chloral) | 18 | 80 |
| Chloral-starch (19% Cl) | 29 | 80 |
| Chloral-starch (23.5% Cl) | 23 | 70 |
| Chloral hydrate | 12 | 90 |

The above table shows that the activity of chloral-molasses preparations are roughly proportioned to the chloral content and are fully equivalent to the preferred chloral-starch products claimed in our parent application.

The preferred product is chloral-Masonex which can be prepared for about one-third the cost of the most readily available starch-chloral product. This reduction in cost is most significant for the commercial success of feed supplements which increase the feed efficiency of a ruminant animal. It will also be appreciated that the mixer or large farmer can use the compositions and methods of this invention in his plant or mixing mill using molasses already available plus chloral and only a low temperature source of heat.

The preferred products are the reaction products of cane, beet and wood molasses with chloral (or its equivalent hydrate or lower alkylacetal) having a chloral content of from 10–50% chloral content, preferably 20–40%.

A particularly useful product is the reaction product obtained from liquid (aqueous) wood molasses with chloral in aqueous solution at about steam bath temperature in the proportions of the preferred range which crude liquid product is then spray dried. This product is a stable, free flowing inexpensive material. In the products with higher ranges of chloral content, excess chloral can be expelled by passing the spray dried material through a dry heat zone.

Other aspects of this invention are the feed or premix compositions as well as the methods of increasing feed efficiency using the molasses-chloral products.

The unit amounts herein or in the claims are expressed in amounts of chloral units since this is the preferred active aldehyde ingredient unless clearly expressed to the contrary. Amounts of other polyhalohemiacetal-molasses products to be used in feed products may be easily calculated from these by those skilled in the art. The method of this invention comprises increasing the feed efficiency of ruminant animals by the administration orally of an amount of molasses haloacetal, preferably molasses chloral in amounts sufficient to increase the feed efficiency but not cause noxious side effects. Such amounts are outlined hereafter.

The ruminant feeds most generally used in conjunction with the method of this invention are the roughage feeds such as silage or various commercial grain mixtures commonly used in ruminant animals, that is, in cattle or sheep. The amount of additive here will be an amount sufficient to improve the feed efficiency of the animal but not to have a pharmacodynamic effect or not to inhibit overall fermentation in the rumen; in the range of about 1 g. to 1 kg. per ton of feed (about 0.001–0.1%) preferably from about 100–400 g./ton based on chloral content since the molasses derived carrying portion of the condensation product is not active. The molasses is useful in itself for various nutrients and vitamins it normally contains. An average sheep will ingest about 3–4 lbs. of food daily. An average cow about 25 lbs.

Most useful quantities of the preferred molasses-chloral hemiacetal ingredient will run from about 40 g.–3 kg. (5 lbs.) per ton of feed preferably 400 g.–2 kg./ton. An average 80 lb. sheep will ingest about 0.4–4 g. of this active ingredient daily dispersed in its feed. An average 1000 lb. cow about 4–8 g. Note these are weights of hemiacetal or chloral.

For commercial use, the active ingredients may be used as premix formulations in which the chemical is distributed uniformly throughout a standard animal feed carrier. This premix or concentrate is then mixed with either a normal or a special fattening diet of the ruminant as desired. Examples of such carriers are soybean meal, corn oil, ground corn, barley, wheat, mineral mixtures such as vermiculites, diatomaceous earth, corn gluten meal, corn distillers solubles or soyflour. The active ingredient will be in amounts to satisfy the criteria set forth above for whole feed. The active ingredient will usually be present in from about 5–75% by weight of the premix composition depending largely on the physical properties of the ingredient. If the amount of molasses used suffices, unreacted portions of the molasses may form the bulking agent with no additional carrier needed.

The supplemented animal feeds themselves may also contain cellulosic roughage such as cellulose, hay, straw, corn stalks, cotton seed hulls, oats, barley, and cereal brans; natural oils such as animal fats, fish oils, and whale oil; vegetable oils such as soybean oil, olive oil, safflower oil, peanut oil, and cottonseed oil; antioxidants, minerals; vitamins, antibiotics, anthelmintics, and other appropriate medicaments.

A typical prepared animal feed is as follows:

Mixed hay _____percent__ 40.0
Ground yellow corn _____do____ 45.0
Soybean oil meal _____do____ 7.0
Cane molasses _____do____ 7.0
Dicalcium phosphate _____do____ 0.5
Trace minerals salt _____do____ .5
Vitamin A _____ 300 I.U./lb.
Vitamin D _____ 150 I.U./lb.
Solid wood molasses-chloral (20% chloral)
    1 lb./ton of feed An example of a suitable premix is as follows:

Spray dried chloral-molasses (25%)—2 lb.
Ground yellow corn—to 3 lb.

This mix may be added to a ton of feed.

In the field the active ingredients may be administered by means of salt or molasses blocks. A typical block may be prepared using the following conditions:

Ingredient:                           Weight percent
    Dried cane molasses, partially reacted with
        chloral hydrate (25%) _____ 59.54
    Ground soybean hulls _____ 14.90
    Granulated salt _____ 21.59
    Trace minerals and vitamins _____ 0.20
    Stabilized animal fat _____ 1.11
    Moisture _____ 2.66

The method of this invention comprises allowing the cattle or sheep to feed ad libitum on the supplemented rations or to be fed under pen conditions on a regular schedule.

Normally the greatest feed efficiency is realized from using the method and composition of this invention on rough fodder or normal grain feeding.

While the term "chloral" is used herein, other haloacetaldehydes may be equivalently used such as bromal, chloro or bromoacetaldehyde, dichloro or dibromo acetaldehyde. The term "molasses chloral" is used also to define the reaction product of molasses with chloral (or its hydrate, etc.) even though the exact structure of the active compounds formed is unknown at this time. We may presume that most of the active reaction products are acetal derivatives of sugars such as contained in cane or beet molasses or with hemicelluloses contained in wood molasses.

We claim:

1. The method for improving the feed utilization of ruminant animals comprising administering orally as an active ingredient to such animals an effective but nontoxic quantity from the range of from about 0.4–8 g. per animal per day based on chloral content of the reaction product of molasses and chloral.

2. The method of claim 1 in which the molasses is wood molasses with a hemicellulose content of from about 50–60%.

3. The method of claim 1 in which the molasses chloral product is derived from liquid wood molasses reacted with chloral then spray dried.

4. The method of claim 1 in which the chloral content of the active ingredient is from about 10–50% by weight.

5. The method of claim 4 in which the chloral content is from about 20–40% by weight.

6. An animal feed effective for improving the feed utilization of ruminant animals supplemented with an effective but nontoxic quantity of the reaction product of molasses and chloral within the range of about 1 g.–1 kg. of said molasses chloral per ton of feed based on chloral content.

7. The animal feed of claim 6 supplemented with a quantity of molasses-chloral being derived from the reaction of chloral with wood molasses of from 50–60% hemicellulose content.

8. The animal feed of claim 6 supplemented with a quantity of molasses chloral derived from liquid wood molasses reacted with chloral then spray dried.

9. The animal feed of claim 6 supplemented with a quantity of molasses chloral within the range of about 40 g.–3 kg. of molasses chloral per ton of feed.

10. The animal feed of claim 6 supplemented with a quantity of molasses chloral within the range of from about 400 g.–2 kg. of molasses chloral per ton of feed, said molasses chloral having a chloral content of from about 10–50% by weight.

11. A premix feed containing a quantity of molasses-chloral as defined in claim 6.

12. A premix feed containing a quantity of molasses-chloral as defined in claim 7.

13. A premix feed containing a quantity of molasses-chloral as defined in claim 8.

14. A premix feed containing a quantity of molasses-chloral as defined in claim 9.

15. A premix feed containing a quantity of molasses-chloral as defined in claim 10.

References Cited

UNITED STATES PATENTS

| | | | |
|---|---|---|---|
| 2,784,180 | 3/1957 | Tislow et al. | 424—180 X |
| 2,784,237 | 3/1957 | Bruce | 260—615 A |
| 2,927,054 | 3/1960 | Lang | 260—209 RX |
| 2,991,179 | 7/1961 | Kviesitis et al. | 99—6 |
| 3,137,661 | 6/1964 | Rose et al. | 260—615 AX |

OTHER REFERENCES

Journal of Dairy Science, volume 51, No. 6, pp. 882–887, 1968, R. A. Prins et al.

NORMAN YUDKOFF, Primary Examiner

K. P. VAN WYCK, Assistant Examiner

U.S. Cl. X.R.

424—350; 426—2